Aug. 20, 1968 M. A. BARROW 3,397,526
FRUIT PICKER
Filed April 7, 1966
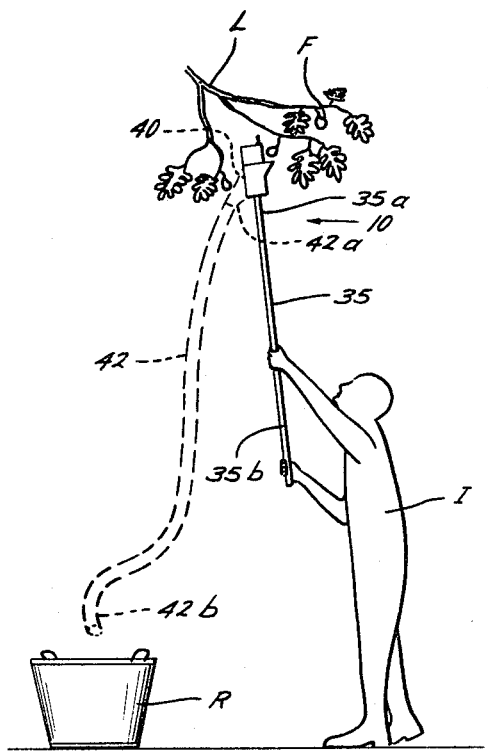
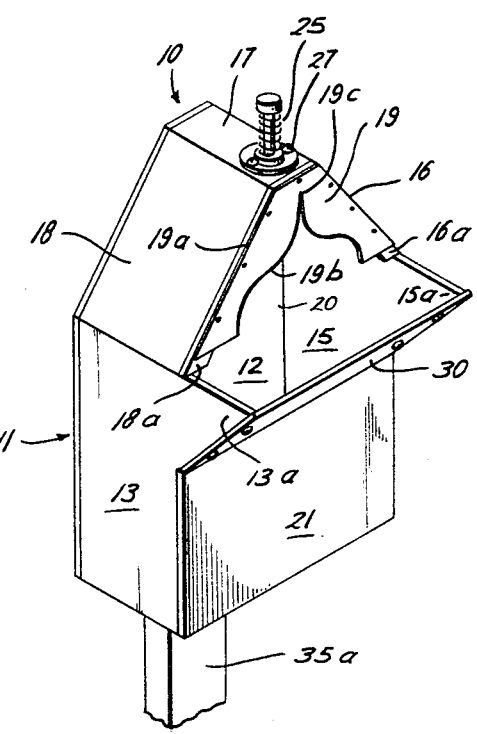
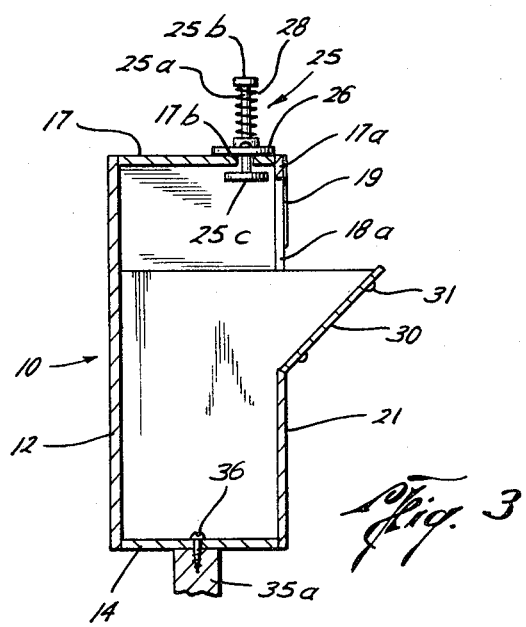
Marvin A. Barrow
INVENTOR.
BY Hayden & Pravel
ATTORNEYS

United States Patent Office 3,397,526
Patented Aug. 20, 1968

3,397,526
FRUIT PICKER
Marvin A. Barrow, P.O. Box 123,
Mont Belvieu, Tex. 77580
Filed Apr. 7, 1966, Ser. No. 540,888
5 Claims. (Cl. 56—340)

This invention relates to a new and improved fruit picker and more particularly to a new and improved portable fruit picker that is adapted to permit an individual to easily pick fruits and the like from fruit trees of any height.

It is well known that picking fruits and the like from fruit trees is a difficult, sometimes hazardous endeavor. The individual picking such fruits and the like, usually must position himself adjacent or in the fruit tree with such apparatus as a ladder or other suitable means which is subject to falling or dropping out of the tree. Thus it should be apparent that it is desirable to provide a means for picking fruits and the like from fruit trees that eliminates the necessity of the individual positioning himself upwardly relative to the ground adjacent the fruit in the tree.

It is an object of the present invention to provide a device for picking fruits and the like from fruit trees that provides a means for removing the fruit from the fruit tree.

Yet another object of the present invention is to provide a new and improved portable device for picking fruits and the like from fruit trees.

Still another object of the present invention is to provide a fruit picking device adapted to remove or pick fruits located in any area of a fruit tree, while simultaneously enabling the individual fruit picker to remain on the ground adjacent the fruit tree.

The preferred embodiment of this invention will be described hereinafter, together with other features thereof, and additional objects will become evident from such description.

The invention will be more readily understood from a reading of the following specifications and by reference to the accompanying drawing forming a part thereof, wherein an example of the invention is shown, and wherein:

FIG. 1 is a view illustrating one embodiment of the fruit picker of the present invention as it is being used to pick fruit;

FIG. 2 is an enlarged perspective view of the fruit picker of the present invention illustrating a receiving and storage area of the fruit picker adapted to receive and store small fruits and the like; and FIG. 3 is a central cross sectional side view of the fruit picker of the present invention as illustrated in FIG. 2.

As illustrated in FIGS. 1, 2 and 3, the fruit picker of the present invention is generally designated at 10. As illustrated in FIGS. 2 and 3 the fruit picker 10 includes a means or enclosure for receiving the fruit generally designated at 11 which is provided with a bottom wall 12. Connected to the bottom wall 12 are a plurality of upwardly extending walls or sidewalls 13, 14, 15, 16, 17, and 18. The walls 13 and 15 extend upwardly and are connected at the back end thereof by the transversely extending wall 14 and upper wall 21 is secured to the top portions of walls 13, 14 and 15. Each of the walls 13 and 15 are secured at their forward end to the angularly positioned walls 16 and 18, respectively. As further illustrated in FIGS. 2 and 3, the angularly positioned walls 16 and 18 are connected by the upwardly extending wall 17 which is depicted as being shorter in width but paralleled to the back wall 14. Thus, it should be apparent that since the angular position of the walls 16 and 18 is towards each other and that the side wall 17 connects the walls 16 and 18 together, that the forward end of the fruit picker 10 is pointed in shape.

As illustrated in FIGS. 2 and 3 a cutting means or blade means 19 is mounted on the upper portions of each of the side walls 16, 17, and 18 respectively. It should be noted that the upper portions have inturned flanges 16a, 17a, and 18a which define with upper wall 21 an opening 20. The blade means 19 is shaped on the outer edge 19a thereof to conform with the configuration of walls 16, 17 and 18, and on the inner edge 19b, which extends outwardly into the opening 20, the blade means 19 is symmetrically shaped on each side adjacent the walls 16 and 18 respectively, until merging at a point 19c adjacent the side wall 17. It should be noted that the inner edge 19b of the blade means 19 is the sharpened or cutting part of the blade means.

As illustrated in FIGS. 2 and 3 a detaching means 25 is provided for performing a function to be brought up hereinafter. The detaching means 25 includes a rod 25a which extends through an opening 17b in the side wall 17 and is provided at each end thereof with heads 25b and 25c. A mounting bracket 26 is secured to the outer surface of the side wall 17 by wood screws 27 or other suitable means. Positioned between the mounting bracket 26 in the head 25b is a spring means 28. The detachable means 25 is formed and constructed so that when the fruit picker 10 is substantially stationary the tension in the spring means 28 will prevent the head 25c from moving backwardly and/or outwardly into the enclosure, however if the fruit picker 10 is suddenly jerked, pushed or shoved the weight of the rod 25a and the head 25c will overcome the tension of the spring means 28 and move outwardly into the opening. It should be noted that after the head 25c has moved outwardly into the opening that the spring means 28 thereafter urges the detachable means 25 in the position as shown in FIGS. 2 and 3.

Adjacent one edge of upper wall 21 is a retainer wall 30 which is made of a transparent material such as plastic or glass or any other suitable means and extends angularly upwardly and outwardly over the opening 20 of the enclosure 11. The retainer wall 30 is secured on each side thereof to raised portions 13a and 15a, respectively of each of the side walls 13 and 15 by any suitable means such as nuts and bolts or wood screws 31.

As illustrated in FIG. 1 and partially in FIGS. 2 and 3 a handle means 35 is secured at its upper end 35a to the wall 14 of the enclosure 11 by any suitable means such as wood screws 36. The handle 35 is provided with a lower end 35b which is adapted to be gripped by a user or individual so that the fruit picker 10 may be positioned closely adjacent the fruit F in a fruit tree, a limb L of which is shown in FIG. 1. It should be noted that the handle means 35 may be of any suitable length and is adapted to be adjusted to any suitable length.

In the operation of the invention the enclosure 11 is positioned adjacent a piece of fruit F in a fruit tree by the individual gripping the handle 35 at the lower end 35b thereof and positioning the enclosure 11 such that the body of the fruit F is permitted to enter the enclosure through the opening 20 and by thereafter pulling downwardly and/or outwardly until the stem of the fruit F is engaged by the cutting blade 19b of the blade means 19 so that the stem of the fruit is thereby severed from the tree and the fruit F is removed from such tree. It should be apparent that the fruit can be stored in the enclosure 11 until the enclosure 11 becomes full of such pieces of fruit. When the enclosure 11 does become full of pieces of fruit it may thereafter be emptied in any type of receptacle or container.

If a piece of fruit F should become stuck or become retained on the edge of the blades of the blade 19b the detachable means 25 is then activated as previously mentioned so that the head 25c overcomes the tension in the spring means 28 to move downwardly or outwardly into the enclosure to engage and contact the stuck or retained piece of fruit and force such fruit away from and off the blades so that the blades are thereafter cleared to receive another piece of fruit or stem of a piece of fruit for cutting.

In another embodiment of the fruit picker 10, the bottom or undersurface 12 of the enclosure 11 is provided with an opening 40 as illustrated in FIG. 1. A passage means or tube means 42 is mounted with the bottom 11 in an upper end 42a in any suitable manner such as with glue, nuts and bolts or wood screws. The lower end 42b of the passage or tube means 42 is adapted to be positioned in, mounted with, secured to or positioned adjacent to a receptacle means or receiving means R which may be formed of any type of a basket, wagon or other suitable means. As the fruit F is severed from the tree as mentioned hereinabove, such fruit F then moves through the opening 40 in the bottom 12 of the enclosure 11 to enter the passage or tube means 42a. The fruit thereafter travels down the passage or tube means 42a to be positioned in the receptacle means R or for storage with other pieces of fruit that have been severed from the fruit tree or trees.

Briefly, this invention relates to a new and improved fruit picker for removing fruit from trees including a cutting means for severing the fruit from the tree, a means for receiving the fruit after it has been removed from the tree, and a handle means for positioning said cutting means and means for receiving the fruit adjacent the fruit in the tree.

What is claimed is:

1. A device for picking fruit from a fruit tree comprising:
    (a) a cutting means for removing the fruit from the tree;
    (b) means for receiving the fruit after the fruit has been removed from the tree mounted with said cutting means, and
    (c) handle means having an upper and lower end, said upper end being mounted with said means for receiving the fruit and said lower end being adapted to be gripped by an individual user standing on the ground adjacent the tree whereby said cutting means and said means for receiving the fruit mounted therewith are moved to successive pieces of fruit so that the successive pieces of fruit are removed by said cutting means and thereafter positioned in said means for receiving;
    (d) said means for receiving fruit including an enclosure having a bottom, a plurality of side walls with some of said side walls forming a pointed forward end, said enclosure having an upper wall which with said forward end defines an opening through which fruit to be harvested enters said enclosure;
    (e) said cutting means includes a blade means secured to the upper portions of said side walls adjacent said forward end and extending into said opening such that the stem of the fruit which entered said enclosure through said opening is adapted to be cut by said blade means and the fruit falls to the bottom thereof.

2. The structure as set forth in claim 1 including:
    a transparent retainer wall mounted adjacent said upper wall of said enclosure and extending upwardly and outwardly over said opening for ensuring that the fruit is positioned through said opening and in said enclosure whereby said blade means is thereby enabled to cut the stem of the fruit by pulling said handle means downwardly and the fruit is thereafter retained in said enclosure.

3. The structure as set forth in claim 1 including a detachable means mounted on said forward end of said enclosure for detaching any fruit that becomes stuck and retained on said blade means after being cut by said last named means.

4. The structure as set forth in claim 1 wherein said bottom of said enclosure has an opening therein adapted to receive the fruit after it has been cut and wherein said fruit is thereby enabled to fall into a receptacle positioned on the ground therebelow.

5. The structure as set forth in claim 4 including:
    (a) a tube means having an upper and lower end, said upper end of said tube means being connected to said bottom adjacent said opening therein and the lower end adapted to deposit the fruit being harvested and conveyed by said tube into a container resting on the ground.

References Cited

UNITED STATES PATENTS

| | | | |
|---|---|---|---|
| 59,655 | 11/1866 | Richards et al. | 56—340 |
| 160,341 | 3/1875 | McDevitt | 56—340 |
| 925,885 | 6/1909 | Fahnestock | 56—339 |
| 964,108 | 7/1910 | Johnson | 56—340 |
| 1,088,295 | 2/1914 | Quick et al. | 56—340 |
| 1,105,302 | 7/1914 | Pindell | 56—340 |

RUSSELL R. KINSEY, *Primary Examiner.*